Figure 1:
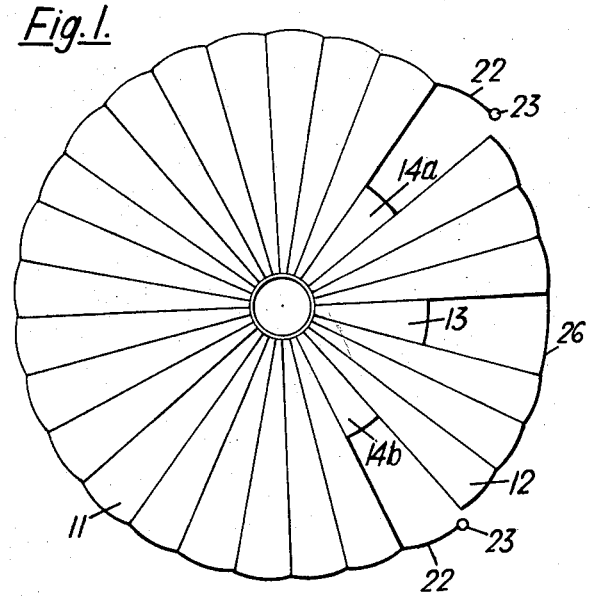

Feb. 23, 1965   J. T. BASNETT   3,170,661
PARACHUTES

Filed May 14, 1963   4 Sheets-Sheet 1

Inventor
James Thomas Basnett

By
Attorneys

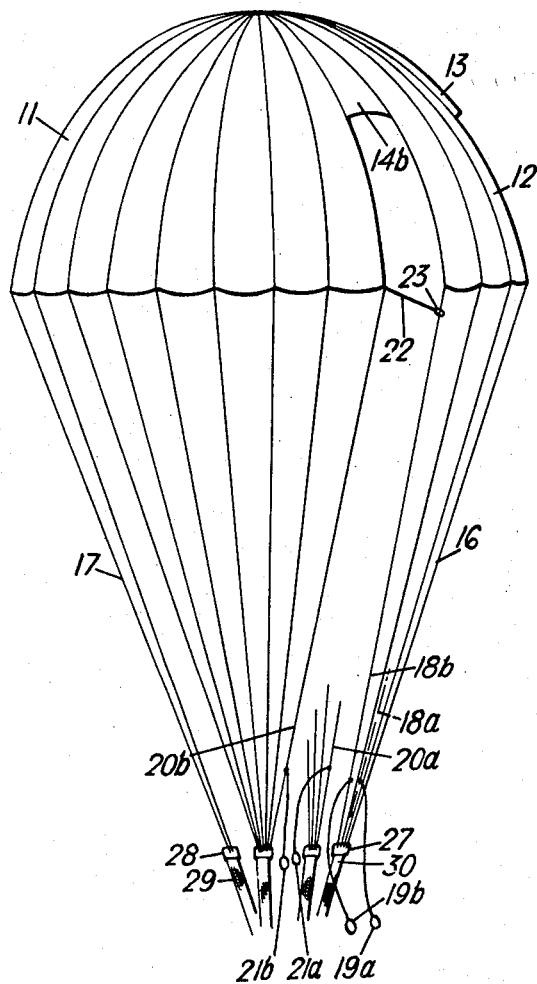

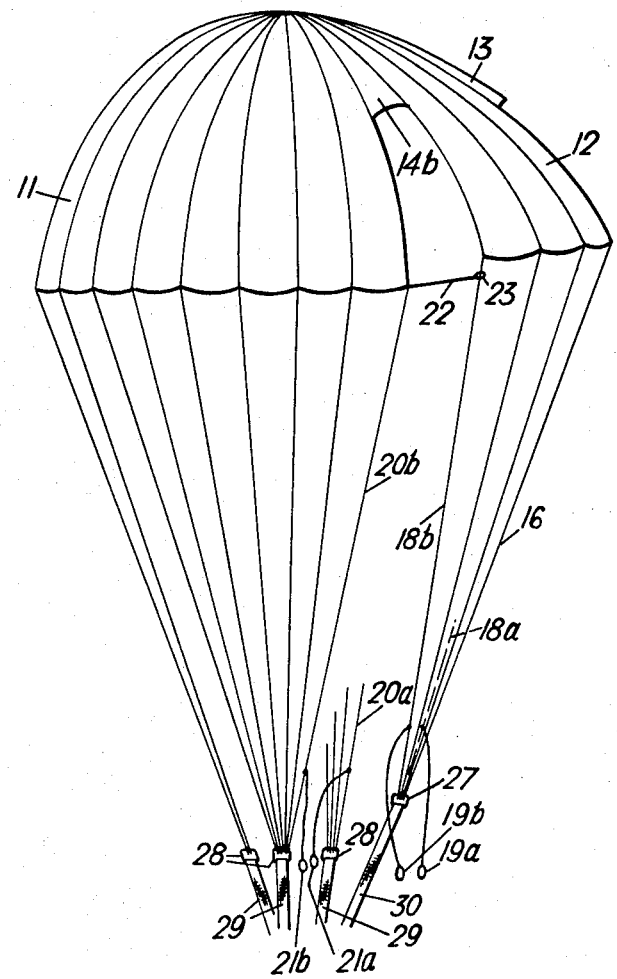

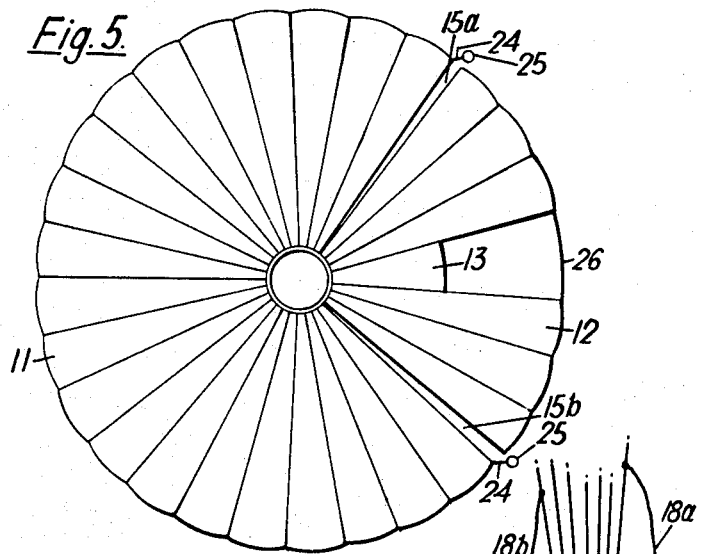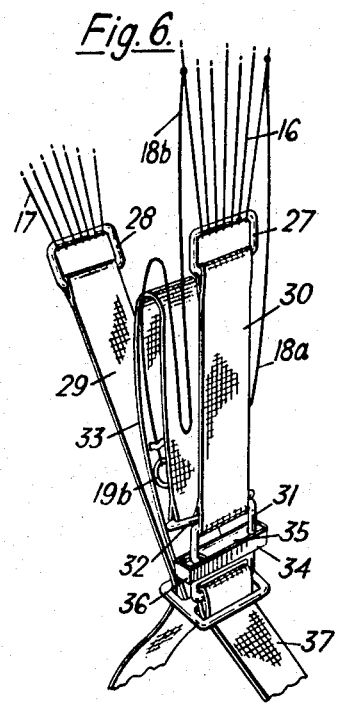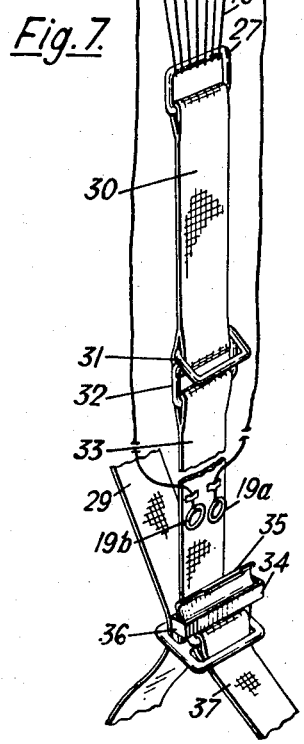

3,170,661
PARACHUTES
James Thomas Basnett, Woking, Surrey, England, assignor to C. Q. Parachute Company Limited, Woking, England, a British company
Filed May 14, 1963, Ser. No. 280,319
Claims priority, application Great Britain, May 15, 1962, 18,611/62
3 Claims. (Cl. 244—152)

This invention is for improvements in or relating to parachutes.

A so-called "blank gore" parachute is one from which a gore has been wholly or partially removed. Such removal enables the parachutist, when the parachute canopy is fully deployed, to control the direction of descent because there is an inherent drift characteristic in the canopy due to the fact that a greater pressure builds up inside the canopy in the region directly opposite the removed gore and means are provided to enable the parachutist to alter at will the direction in which this drift is effective. The means are usually a pair of extension cords from the rigging lines which bound the "blank gore" to a position within reach of the parachutist.

Blank gore parachutes are known in which more than one gore has been partly or wholly removed to increase the inherent drift of the parachute. This alteration also, in some cases, increases the rate of descent of the parachutist to a degree that may be dangerous.

The principal object of this invention is to provide a parachute which can be steered by the parachutist and which can be manipulated by the parachutist in flight to give a selected one of a number of speeds of both drift and rotation.

According to one aspect, the invention consists of a parachute comprising a canopy which possesses two different sets of characteristics which can be selected by the parachutist while the parachute is in flight, one characteristic consisting of or including a drift speed and the other characteristic consisting of or including a different drift speed.

According to another aspect, the invention consists of a parachute comprising a canopy which is so constructed that, inherently when deployed, a difference in air pressure exists between two diametrically opposed regions of the canopy and means are provided whereby the parachutist can alter these differences in pressure while the parachute is in flight.

According to a further aspect, the invention consists of a parachute comprising a canopy and a number of rigging lines connecting the canopy to the parachutist, the canopy having two or more openings the relative sizes or shapes of which can be varied by the parachutist while the parachute is in flight, the canopy being formed in two sections each comprising a number of substantially triangular gores, the two sections together forming the complete canopy, in which one section can be moved while the parachute is in flight from a first position relative to the second section to a second position relative to said second section.

According to a still further aspect, the invention consists of a parachute comprising a canopy and a number of rigging lines connecting the canopy to lift webs carried by the parachutist, in which the canopy is formed in two sections each comprising a number of gores, the rigging lines from one section which forms more than half the canopy being connected to at least three lift webs and the lines from the other section being connected to a fourth or other lift web.

According to a further aspect of the invention this fourth or other lift web has an extension which can be brought into operation while the parachutist is in flight.

Figure 3:
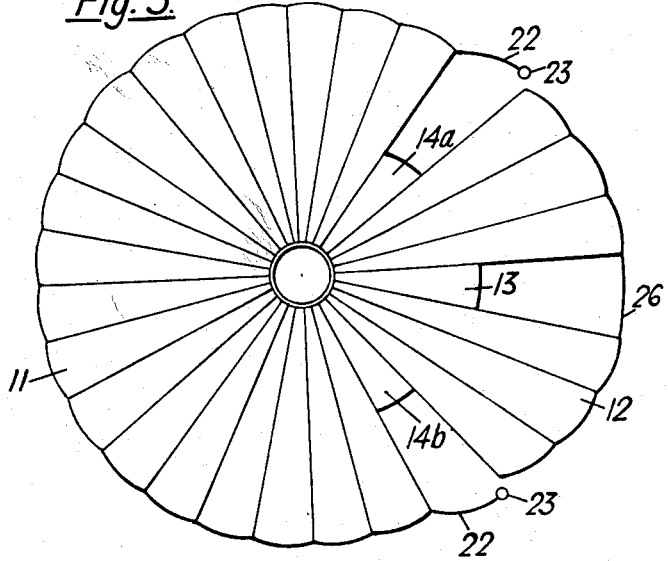

These and other features of the invention will be better understood from the following description of one embodiment of the invention which is illustrated in the drawings of which FIGURES 1 and 2 represent the plan and elevation of a parachute according to the invention when in the first condition of operation, FIGURES 3 and 4 represent the plan and elevation of the same parachute when in the second condition of operation, FIGURE 5 represents a plan of a modified canopy according to the invention, and FIGURES 6 and 7 represent part of the harness according to the invention.

The parachute illustrated in FIGURES 1, 2, 3 and 4 is made of twenty-eight substantially triangular gores in two sections 11 and 12. The section 11 consists of nineteen normal gores and two end gores 14a and 14b which are shorter than the normal gores. The section 12 consists of six normal gores and a shorter gore 13 which is the central gore of the section. The hem tape of the parachute is continued across the gap in the hem produced by the shorter gore 13 as shown at 26. The gaps produced by the shorter gores 14a and 14b are left open but the hem tapes at these points are continued as shown at 22 and terminate in rings 23 which ride on rigging lines 18a and 18b referred to later. The shorter gores 13, 14a and 14b are preferably wider at their hems than the width of the normal gores at the corresponding distance from the apex of the canopy.

Rigging lines connect the canopy to a harness, the lines 16 from the section 12 terminating at ring 27 on lift web 30 of the harness, and the lines 17 from section 11 terminating at rings 28 on the three lift webs 29. The rigging lines 18a and 18b from the edges of section 12 pass through the rings 23 carried by the extensions 22 of the hem tape and themselves are connected to rings 19a and 19b which are connected to the harness as shown in FIGURES 6 and 7. The rigging lines 20a and 20b from the edges of the section 11 are similarly connected to rings 21a and 21b. The rings 19a, 19b, 21a and 21b are always within reach of the parachutist and by pulling on the rings selectively the parachutist can alter the shape or size of the openings in the canopy produced by the shorter gores 14a and 14b and can thus alter the direction of flight of the parachute.

The harness carries four lift webs connected to the rigging lines. Three of these, marked 29 in the drawings, are of the same length and are connected to the harness in any known way. The fourth web is made in two parts 30 and 33 connected by a link 32. The part 30 also carries a link 31 which is held by a quick release 36. When the link is so held the lift web 30 is of the same effective length as the remaining lift webs 29.

The quick release 36 has a lip 35 and a movable square section 34. The lip 35 holds link 31 when the square section 34 is in its upper position. The square section 34 can be moved into a lower position where link 31 can escape. The quick release 36 is carried by harness-web 37.

The parachute normally flies away from the shorter gore 13 at a speed determined by the air conditions at the time. The parachutist can alter the direction of flight by pulling on one or more of the steering rings 19a, 19b, 21a and 21b. If the parachutist wishes to increase his speed, he moves the square section 34 of the quick release 36 into its lower position. The link 31 escapes from the lip 35. The ring 27 thus moves away from the parachutist to a point fixed by the combined lengths of the web 30 and the web 33. This enables the section 12 of the canopy to move from the position shown in FIGURES 1 and 2 into the positions shown in FIGURES 3 and 4. The tail thus created increases the speed of flight. It also may increase the rate of rotation of the canopy and lower the rate of descent of the parachute. The direction of flight can still be controlled by the steering rings.

Instead of providing shorter gores 14a and 14b, which have the effect of reducing the area of the canopy, full gores may be used as shown in FIGURE 5, the seams between the sections 11 and 12 of the canopy being left open for part or the whole of their lengths as shown at 15a and 15b. In this construction the gaps 15a and 15b are bridged by tapes 24 provided at both ends of the hem of section 11, the tapes 24 carrying rings 25 which slide on rigging lines 18a and 18b connected to the end gores of section 12.

In both embodiments the extent of movement of the tail section is determined by the lengths of the extension tapes 22 or 24.

As described the change from one speed to the other speed is controlled manually by the parachutist. The invention is not restricted to this type of control. For example the quick release could be controlled automatically at a predetermined height or by a time controlled unit if desired.

The invention is, of course, not restricted to canopies having twenty-eight sections, or to the tail section being one quarter of the canopy. The two sections can be of any size although it is preferable to have one section larger than the other. Also more than one gore in the tail section could be reduced in size if desired or all the gore could be of the same size. With this arrangement the drift might be negligible wth the tail section in the normal position and drift be given to the canopy by releasing the tail section to the second position.

It is to be understood that the above description is by way of example only and that the invention is not restricted to the examples given above which are by way of example only.

Having described my invention, what I claim as new and desire to secure by Letters Patent is:

1. A parachute comprising a canopy having a hem portion and an apex, the canopy being of a first section and a second section, the first section being relatively larger than the second section, the canopy having openings between the first and the second sections, the openings extending from the hem portion to a point between the hem portion and the apex, the hem portion having tapes of a length to extend across the width of the openings, the tapes being connected to the first section, rigging lines connected to the hem portion and extending from the canopy to a parachute harness, the tapes having line engaging means on the ends thereof, control lines on each edge portion of the second section extending through the line engaging means to a point on the harness for operation thereof, control lines on each edge portion of the first section extending to a point on the harness for operation thereof, the control lines on the edge portions of the first and second sections being operated to control the drift and steering of the parachute, the rigging lines of the second section being of the same length as the rigging lines of the first section, the harness having a plurality of straps with one strap longer than the remainder of the straps and having the rigging lines of the second section connected thereto, the one strap being fore-shortened, release means engaging the fore-shortened strap which when actuated will allow the one strap to increase its length, the lengthening of the one strap allowing the second section to billow out of round and symmetry with respect to the first section.

2. A parachute as set forth in claim 1 wherein the canopy comprises a plurality of connected together gores, the gores between the first and second sections extending from the apex to a point between the apex and the hem portion thus forming the openings between the first and second sections, the ends of the gores between the first and second sections being wider than the width of the remaining gores at a corresponding distance from the apex.

3. A parachute as set forth in claim 1 wherein the first and second sections are separated from the apex to the hem portion thus forming the openings extending from the apex to the hem portion.

References Cited by the Examiner

UNITED STATES PATENTS

| | | | |
|---|---|---|---|
| 3,013,753 | 12/61 | Hughes et al. | 244—145 |
| 3,043,543 | 7/62 | Istel et al. | 244—152 |
| 3,117,753 | 1/64 | Ewing | 244—152 X |

FERGUS S. MIDDLETON, *Primary Examiner.*

UNITED STATES PATENT OFFICE
CERTIFICATE OF CORRECTION

Patent No. 3,170,661                                  February 23, 1965

James Thomas Basnett

It is hereby certified that error appears in the above numbered patent requiring correction and that the said Letters Patent should read as corrected below.

In the grant, lines 2 and 12, and in the heading to the printed specification, line 4, for "C. Q. Parachute Company Limited", each occurrence, read -- G. Q. Parachute Company Limited --.

Signed and sealed this 12th day of October 1965.

(SEAL)
Attest:

ERNEST W. SWIDER                                EDWARD J. BRENNER
Attesting Officer                                      Commissioner of Patents